June 15, 1937.                J. M. BECK                2,083,632
                               KETTLE
                         Filed July 10, 1936
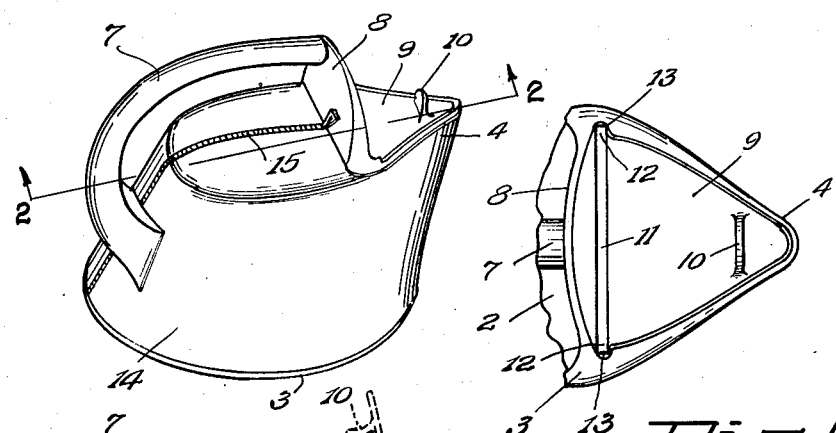
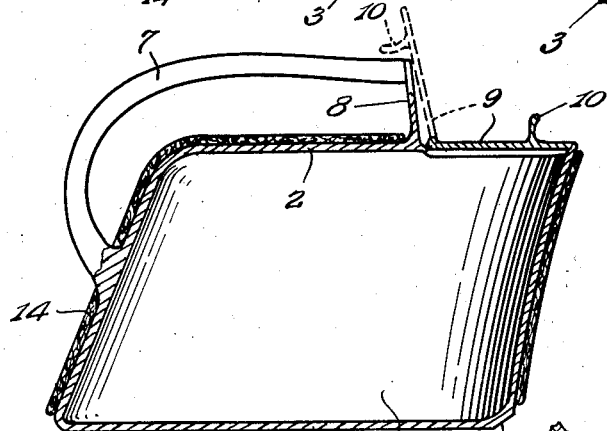
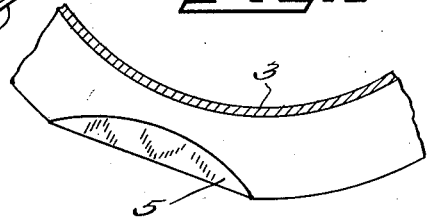
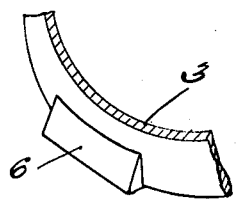
Joseph Master Beck
INVENTOR.
BY
ATTORNEY.

Patented June 15, 1937

2,083,632

UNITED STATES PATENT OFFICE 2,083,632

KETTLE

Joseph Master Beck, Spokane, Wash.

Application July 10, 1936, Serial No. 89,969

4 Claims. (Cl. 53—9)

This invention relates to kitchen ware and more particularly to a tea kettle, one object of the invention being to provide a tea kettle of such construction that water may be quickly boiled therein and easily poured from the kettle.

Another object of the invention is to so form the tea kettle that while it will remain in an upright position and not be liable to tilt over when placed upon a stove, it may be easily tilted forwardly to a pouring position when use of water in the kettle is desired.

Another object of the invention is to provide the same with an improved form of handle which may be firmly grasped when it is desired to pour water from the kettle and has a mounting for its front end which serves not only as a mounting for the handle but also as a shield to deflect steam and prevent a person's hand from being scalded while pouring hot water from the kettle.

Another object of the invention is to so form the lower portion of the front of the kettle that when it is tilted to a pouring position while resting upon a stove or other support, the kettle will be prevented from tilting transversely.

Another object of the invention is to provide the kettle with a jacket of heat insulating material which serves to confine heat therein so that water will quickly boil, the jacket being so constructed that it can be easily applied to or removed from the kettle.

The invention is illustrated in the accompanying drawing wherein

Figure 1 is a perspective view of the improved tea kettle.

Figure 2 is a sectional view taken vertically through the kettle along the line 2—2 of Figure 1.

Figure 3 is a top plan view of the forward portion of the kettle.

Figure 4 is a fragmentary view looking at the lower portion of the front of the kettle.

Figure 5 is a view similar to Figure 4 showing a modified construction.

This improved tea kettle may be formed of any metal desired, and has a hollow body formed with a bottom 1, a top 2, and side walls 3. The side walls of the body have their upper portions tapered towards each other at the front thereof to provide a pouring spout 4 which is open at its top, as shown in Figure 2, but the bottom of the body may be circular. It should also be noted that at the front and rear of the body the walls extend upwardly from the bottom at a forward incline. Therefore, the body has the outline of a parallelogram when viewed in vertical longitudinal section, as shown in Figure 2, and when it is desired to pour water from the kettle through the spout 4 this can be easily done by tilting the kettle forwardly without lifting it from the stove or other support upon which it is resting. The bottom of the kettle is circular and in order to prevent it from tilting transversely and causing water to be spilled while being poured from the kettle, the lower portion of the walls at the front of the kettle may be beveled, as shown at 5 in Figures 2 and 4, to provide a flat surface upon which the kettle will rest when tilted forwardly for pouring, or a block 6 which projects forwardly from the front of the kettle and serves as a fulcrum may be welded to the front of the body or formed integral therewith. By forming the kettle with the flat surface 5 or the fulcrum 6 it may be easily rocked forwardly to pour water from the spout and then returned to its normal position in which it rests upon its bottom 1 without likelihood of the kettle tilting transversely.

In order to lift the kettle, there has been provided a handle 7 which is of a goose-neck formation and extends longitudinally over the top of the body with its rear portion curved downwardly and then forwardly and united to the forwardly inclined rear portion of the walls of the body. At its front end the handle is united to a plate 8 which rises from the top 2 along the front end thereof. Referring to Figure 3, it will be seen that the plate is curved transversely of the kettle, and upon referring to Figure 2, it will be seen that it extends upwardly at a rearward incline. Therefore, when the kettle is tilted forwardly to pour hot water from the spout, the plate 8 will serve very effectively as a shield or deflector to prevent steam from striking a hand holding the handle and causing the hand to be scalded. This plate also serves as a prop or rest for the lid 9 which serves as a closure for the spout but is swung upwardly to the position indicated by dotted lines while pouring water from the kettle. The spout serves not only for pouring water from the kettle but also as a filling opening. The lid has a thumb lift 10 adjacent its front end and along its rear edge is formed with a bead 11 having its ends extended to provide pintles 12 which fit into sockets or seats 13 and serve to pivotally mount the lid.

It is desired to permit water in the kettle to be quickly brought to a boiling point and in order to accomplish this, there has been provided a jacket 14 which conforms to the shape of the walls of the body and has a portion at its top adapted to cover the top 2 back of the shield or plate 9. This cover is split vertically along its back so that it may be applied to the body of the kettle, as shown in Figures 1 and 2, and in order to unite the rear edges after the jacket has been applied, there have been provided fasteners of the "zipper" type which securely but detachably hold the jacket in place. This jacket is formed of asbestos or any other heat insulating material desired and serves very effectively to prevent radiation of heat from the sides and the top of the kettle. Therefore, the water in the kettle may be quickly heated and also permit the kettle to be lifted without discomfort due to heat radiating therefrom.

Having thus described the invention, what is claimed is:

1. A tea kettle comprising a hollow body having a bottom, a top, and walls, the top terminating in spaced relation to the front of the body to provide a pouring opening, a plate rising from the top along the front end thereof back of the pouring opening and constituting a steam shield, and a lid for the pouring opening having its rear end pivotally mounted in front of said plate whereby the lid may be swung upwardly to an opened position and rest against the plate.

2. A tea kettle comprising a hollow body having a bottom, a top, and walls, the top terminating in spaced relation to the front of the body to provide a pouring opening, a plate rising from top along the front end thereof back of the pouring opening and constituting a steam shield, sockets being formed in front of the plate at opposite sides of the body, and a lid for closing the pouring opening having a bead along its rear edge extended beyond opposite sides of the lid to provide pintles engaged in said sockets and pivotally mounting the lid whereby the lid may be swung upwardly to an opened position and rest against the plate.

3. A tea kettle comprising a hollow body having a bottom, a top, and walls, the top terminating in spaced relation to the front of the body to provide a pouring opening, a plate rising from the top along the front end thereof back of the pouring opening and constituting a steam shield, the plate being curved longitudinally from one side of the body to the other and extending upwardly at a rearward incline, and a lid for the pouring opening having its rear end pivotally mounted in front of the plate whereby the lid may be swung upwardly to an opened position and rest against the plate.

4. A tea kettle comprising a hollow body having a pouring opening at the front of its top, a plate rising from the top at the rear of the pouring opening and extending transversely of the top to provide a steam shield, and a handle for said body secured at its rear end to the back of the body intermediate the height thereof and extending upwardly and forwardly over the top of the body with its front end secured to said plate.

JOSEPH MASTER BECK.